United States Patent [19]
Dennis et al.

[11] Patent Number: 5,956,171
[45] Date of Patent: Sep. 21, 1999

[54] ELECTRO-OPTIC MODULATOR AND METHOD

[75] Inventors: Michael L. Dennis; William K. Burns, both of Alexandria; Irl N. Duling, III, Round Hill, all of Va.

[73] Assignee: The United States of America as represented by the Secretary of the Navy, Washington, D.C.

[21] Appl. No.: 08/690,135

[22] Filed: Jul. 31, 1996

[51] Int. Cl.⁶ .................................................. G02F 1/09
[52] U.S. Cl. .......................................... 359/281; 356/350
[58] Field of Search ................................. 359/280, 281; 356/350

[56] References Cited

U.S. PATENT DOCUMENTS

| | | | |
|---|---|---|---|
| Re. 35,023 | 8/1995 | Ferrar | 356/350 |
| 4,456,376 | 6/1984 | Carrington et al. | 356/350 |
| 4,588,296 | 5/1986 | Cahill et al. | 356/350 |
| 4,787,741 | 11/1988 | Udd et al. | 356/35.5 |
| 4,789,241 | 12/1988 | Michal et al. | 356/350 |
| 4,834,493 | 5/1989 | Cahill et al. | 350/396 |
| 5,056,919 | 10/1991 | Arditty et al. | 356/350 |
| 5,235,404 | 8/1993 | Fejer et al. | 356/351 |
| 5,416,859 | 5/1995 | Burns et al. | 385/3 |
| 5,485,274 | 1/1996 | Kemmler | 356/350 |
| 5,577,057 | 11/1996 | Frisken | 372/18 |

OTHER PUBLICATIONS

N.A. Whitaker, Jr. et al., Low–Drift Modulator Without Feedback, *IEEE Photonics Technology Letters*, vol. 4, No. 8 (Aug., 1992).

M.L. Dennis et al., Inherently Bias Drift Free Amplitude Mudulator, 32 *Electronics Letters* 547 (vol. 32, No. 6, Mar. 14, 1996).

P.H. Lee et al., Measurement of Saturation Induced Optical Nonreciprocity in a Ring Laser Plasma, *IEEE Journal of Quantam Electronics*, vol. QE–2, No. 8, Aug. 1966.

*Primary Examiner*—David C. Nelms
*Assistant Examiner*—Thomas Robbins
*Attorney, Agent, or Firm*—Thomas E. McDonnell; Edward F. Miles

[57] ABSTRACT

An optical intensity modulator which uses a Sagnac interferometer having an electro-optic phase modulator therein. An electric modulation signal is delivered to the modulator, and the latter is selected so that the phase velocity of optical and electrical signals are comparable in it. This causes the optical signal from one interferometer arm to copropagate through the modulator with the electrical signal, increasing interaction time with it, and causes the optical signal from the other arm to counterpropagate with the electric signal, reducing interaction time. In addition to phase modulating the optical signals by the electrical signal, the electro-optic effect in the modulator phase shifts the optical signals with respect to one another, permitting them to form a non-zero interference pattern, whose intensity corresponds to the electrical signal. In one embodiment, the interferometer has a non-reciprocal device to impose a constant phase difference between the counterpropagating optical signals, which permits one to place the system's setpoint to any arbitrary point on the system's transmissivity versus phase response, e.g. large signal and/or linear response.

16 Claims, 2 Drawing Sheets

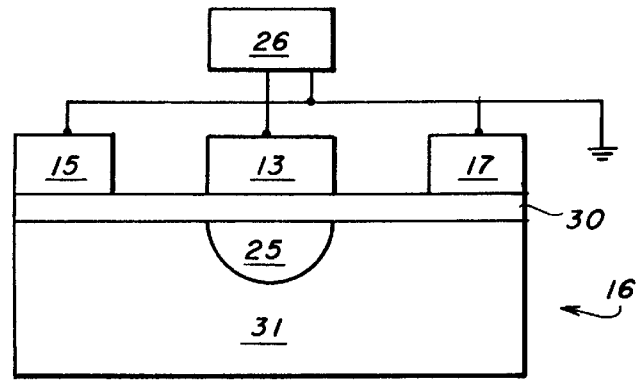
FIG. 2
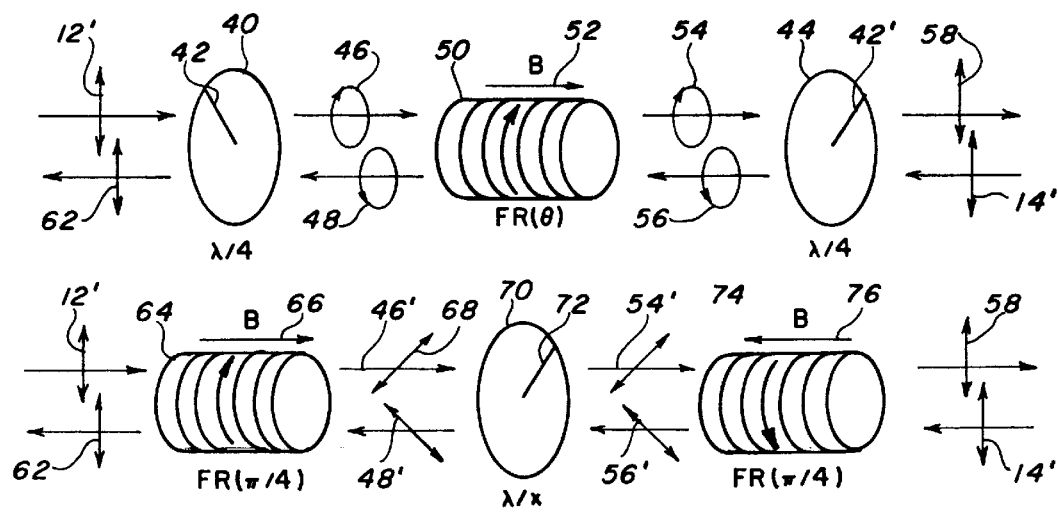
FIG. 3(a)
FIG. 3(b)

ELECTRO-OPTIC MODULATOR AND METHOD

BACKGROUND OF THE INVENTION

The capability of modulating the intensity of light in an optical fiber at high frequencies is essential to the development of very high speed optical communications, advanced sensors, and high frequency signal processing. A variety of techniques have been developed, the most important being gain modulation of a semiconductor diode laser and external modulation of a continuous wave source in an integrated optic modulator. The most successful devices for the latter approach are based on waveguide Mach-Zehnder interferometers implemented in lithium niobate (LiNbO$_3$). The Mach-Zehnder interferometer is an optical device wherein input light is split and travels along two continuous paths, and is recombined. The two optical paths may be of different lengths so that on recombination the two beams may interfere either constructively or destructively. Lithium niobate is an electro-optic material, such that its index of refraction, and thus the optical path length traveled by light passing through the material may be varied by the application of an electric field. In a lithium niobate-Mach-Zehnder amplitude modulator, an electric field (which may be modulated) is applied across one of the interferometer arms (or an opposite field is applied across the two arms) to vary the interference at the output. For very high frequency operation, a "traveling wave" geometry is used wherein the applied electric field propagates down the electrodes, which are constructed as a microwave waveguide, at the same speed as the light propagates through the optical waveguide. The modulation on the input electrical signal is thus transferred to the intensity of the output light.

Despite the broad application of Mach-Zehnder amplitude modulators in both analog and digital applications, they have a number of drawbacks. Chief among these is the problem of bias drift. In operation, the modulator is typically required to be operated about a particular point in its transmission characteristic, i.e. at a particular bias. For example, for linear operation as required in analog systems (e.g., cable television distribution or radar applications), the Mach-Zehnder modulator is operated at the 90° (quadrature) bias point. Improper bias causes undesirable effects in the transmitted optical signal, such as increased harmonic distortion in analog systems and inter-symbol interference in digital systems. In general, it is impossible to fabricate a modulator with the proper intrinsic bias. Thus the bias is usually set by applying DC voltage. Furthermore, the required bias voltage is not absolutely fixed: It may vary with time due to external environmental factors (e.g. temperature, acoustic effects) or internal factors (intrinsic field screening by long-term charge transport in lithium niobate or silicon dioxide layers). The latter source of bias drift is particularly pernicious, as it can easily swing the bias phase over a full 360° (2π radians) on time scales of the order of several months, so that some means of complicated feedback controlled bias tracking is essential to extend the usable lifetime of a modulator in practical application. This problem has also spurred considerable research, mostly unsuccessful, toward the development of an intrinsically more stable device. A second drawback is the relatively high insertion loss of Mach-Zehnder devices (3–5 dB, typically). This loss results from the bends in the optical waveguides in the Mach-Zehnder configuration. Improving both of these features is the subject of a number of research efforts worldwide.

Clearly, then, an amplitude modulator with an intrinsically stable bias would have great impact in communications, electronic warfare, and other applications. A reduction in the intrinsic loss would be beneficial as well.

SUMMARY OF THE INVENTION

Accordingly, an object of the invention is to permit intensity modulation of an optical signal by an interferometric system whose phase bias is inherently more stable than that of a Mach-Zehnder interferometer.

Another object is to permit intensity modulation of an optical signal by an interferometric system whose insertion loss is inherently less than that of a Mach-Zehnder interferometer.

In accordance with these and other objects made apparent hereinafter, the invention concerns an electro-optic method and apparatus in which an optical input is directed to a Sagnac interferometer to create counter-propagating optical signals in the interferometer's arms, and through an electro-optic modulator in the interferometer. An electric traveling wave, typically an RF signal carrying information, is launched through said modulator along the direction of propagation of the counter-propagating optical signals. The speed of propagation of the electric signal, and said counter-propagating optical signals, are comparable. By comparable it is meant that the phase velocities of the copropagating RF and optical signals are significantly similar such that points of constant phase on the RF and optical signals will change with respect to one another by not more than one wavelength of the maximum RF frequency of operation over the interaction length of modulator 16, and preferably by not more than a quarter of a wavelength. The result is that the electric signal and one of the counter-propagating optical signals copropagate along through the modulator, and have a significantly long time to interact by the electro-optic effect, whereas the other optical signal and the electrical signal travel in opposite directions, and have significantly less time to interact. This causes a differential phase between the optical signals, which permits them to interfere non-destructively. The resulting interference is an optical signal which is intensity modulated according to the electrical signal.

In one embodiment of the invention, a constant differential phase shifter is disposed in the interferometer which imposes a fixed shift between the counterpropagating optical signals. This permits one to selectively choose any desired operating point on the phase-transmissivity response curve of the system.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 2 is a plan view of an electro-optic modulator useable with the invention.

FIGS. 3a and 3b are plan views of a constant phase shifter useable with the invention.

DETAILED DESCRIPTION

Figure 1:
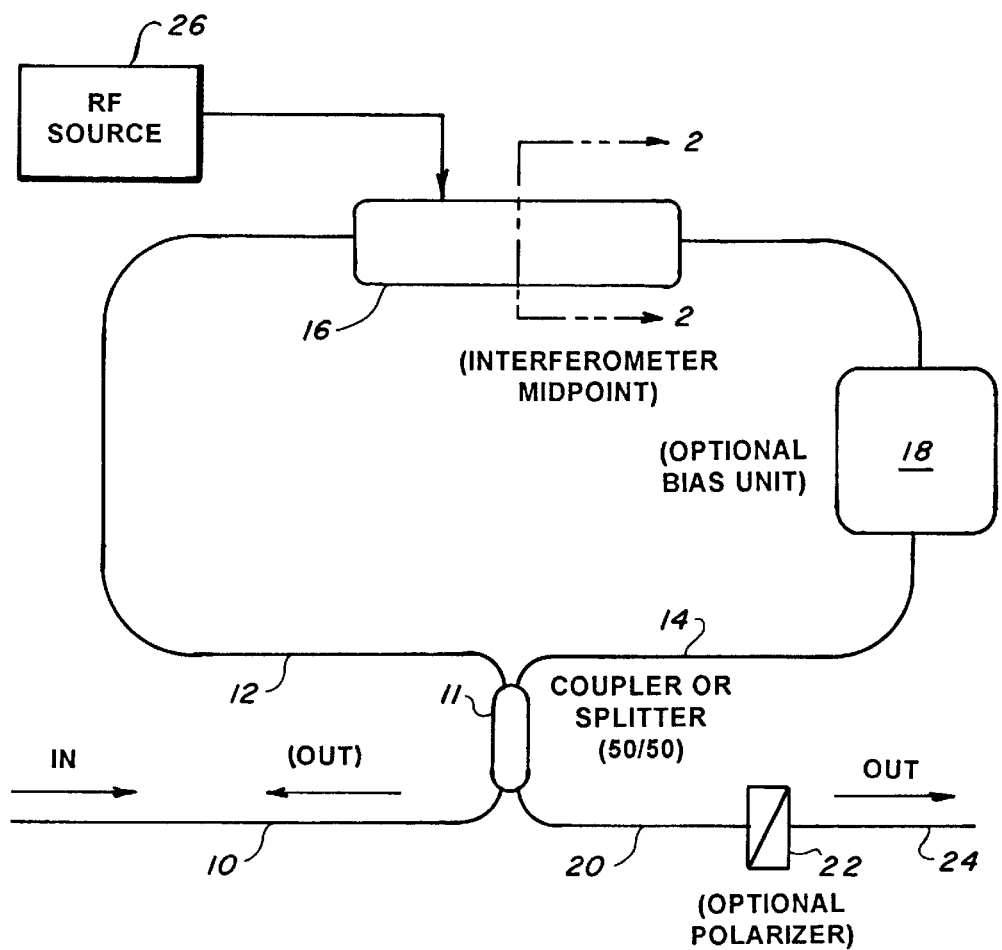
FIG. 1 is a schematic view of an embodiment of the invention.

With reference to the drawing figures, wherein like numbers indicate like parts throughout the several views, FIG. 1 shows a system according to the invention. Optical fibers 12, 14, are connected at opposite ends to an electro-optic phase modulator 16, and to a 3 dB optical beamsplitter 11 to form a Sagnac interferometer, whose input and output lines are optical fibers 10 and 20, respectively. Fibers 12, 14, indeed all the optical components employed in and with the invention, are preferably polarization maintaining, although one could implement the interferometer with other than polarization maintaining fiber so long as one ensures that the signals arriving back at coupler 11 have the same state of polarization and the polarization state at the modulator is appropriate for modulation (i.e. is the polarization state for which modulator 16 is designed). Arm 14 of the interferometer has an optional bias unit 18, which one may use as needed to impart a constant differential phase on the optical signals traversing arms 12 and 14. Member 26, typically an RF signal containing some information, delivers an electrical signal to modulator 16 by which to phase modulate the optical signals counter propagating in interferometer arms 12 and 14. Member 16 is a traveling wave modulator, i.e. one in which the signal from RF source, and the counterpropagating optical signals in arms 12, 14, can co-propagate within modulator, and thus interact continuously while the optical signals traverse modulator 16. One may employ output polarizer 22 if desired, or if needed for a particular application, to remove stray signals which the interferometer scattered into undesired polarization states.

In operation, an optical input signal in fiber 10 splits at 3 dB coupler 11 and launches counterpropagating optical signals into arms 12 and 14. The design of modulator 16 is chosen so that the phase velocities of the RF signal and the counterpropagating optical signals in modulator 16 are comparable. As the RF signal propagates, it causes the index of refraction of the optical waveguide within modulator 16 to vary in proportion to the signal from RF source 26, which causes corresponding variation in the velocity of the optical signals from arms 12, 14 as they traverse through member 16, effectively phase modulating the optical signals. Furthermore, because the optical signals counterpropagate, one of the optical signals will traverse modulator 16 in the same direction as the RF signal, and the other in the opposite direction. This means that the interaction time between the RF signal and the co-propagating optical signal will be much greater than the interaction time between it and the counterpropagating optical signal. In consequence, the two optical signals will experience two different effective indices of refraction as they traverse modulator 16, and will have different transit times therethrough, thus imparting a phase difference between the counterpropagating optical signals. These signals continue counterpropagating through members 12, and 14, and recombine by interfering at coupler 11. Interference yields an optical signal which is intensity modulated in accordance with the phase difference between the interfering signals, i.e. is effectively intensity modulated according to the RF signal to phase modulator 16. The interfered output leaves the system via fibers 10 and 20 for use, or for further processing. The normalized transmission T of a Sagnac interferometer varies as:

$$T(t)=\sin^2[\Delta\phi(t)/2]$$

Where $\Delta\phi$ is the phase difference between the signals in arms 12 and 14, and t is time. Thus, in addition to producing an output which is modulated in accordance with the RF signal, by phase shifting the counterpropagating signals such that $\Delta\phi(t)\neq\pm0, \pm2\pi, \pm4\pi$, etc. the system inherently ensures finite, non-zero, transmission so long as other system variables (e.g. transient acoustic effects in arms 12, 14) do not cancel out the differential phase shifting caused in modulator 16. Furthermore, over a narrow range, the $\sin^2$ function is substantially linear. One may also have bias unit 18 differentially phase shift the optical signals counterpropagating through the interferometer so that, in the absence of any signal from member 26, the differential phase will place the transmission of the interferometer centrally within this linear region (or any desired point on the transmissivity curve). In this manner, member 18 sets a stationary phase bias for the system of FIG. 1.

FIG. 2 shows an end view of an electro-optic device which one can use as modulator 16 in the system of FIG. 1. The device of FIG. 2 is disclosed in U.S. Pat. No. 5,416,859 to Burns et al., and its substance is incorporated herein by reference. Modulator 16 has a substrate 31 into which is formed optical waveguide 25. Atop substrate 31 and waveguide 13 is a dielectric layer 30, typically silicon dioxide, onto which is formed central electrode 13 and reference strip electrodes 15. Material 31 is selected to have a high electro-optic effect in which waveguides such as 25 are readily formed, and is preferably lithium niobate ($LiNiO_3$), which best combines these features. Waveguide 25 is preferably a portion of the substrate into which one has diffused a material such as titanium to define the volume of the waveguide. Dielectric 30 prevents conduction among electrodes 13, 15, 17 through substrate 31. In operation, the signals in interferometer arms 12, 14 cross each other by propagating along waveguide 25 (in a direction perpendicular to the drawing sheet containing FIG. 3) while RF generator directs an RF signal parallel to the optical signals along center electrode 13. The electric field extending between electrode 13 and ground electrodes 15 and 17 is felt through dielectric 30 and into the electro-optic material of substrate 31, including waveguide 25. In this manner, the electric field traveling along the electrodes atop dielectric 30 induces the electro-optic effect in waveguide 25, with the results described above in reference to FIG. 1.

FIG. 3 shows two embodiments of phase biaser 18 of the system of FIG. 1. Both employ Faraday rotators, which is an optical device that, responsive to a magnetic bias applied along its optical axis, either advances or retards the phase of oppositely propagating circularly polarized optical signals of identical polarization helicities by a constant amount proportional to the magnetic bias. Consequently, a Faraday rotator will rotate the polarization of a linearly polarized signal by the same amount and in the same angular direction, regardless of the signal's direction of propagation.

FIG. 3a shows a phase biasing system which is per se known from earlier work in optical gyroscopes. Quarter wave plates 40, 44, and Faraday rotator 50, are disposed along the same optical path to receive counterpropagating, linearly polarized, optical signals 12' and 14' (e.g. the signals from arms 12 and 14 of the system of FIG. 1). The principal birefringence axes of plates 40 and 44 are located with respect to one another so that inputs 12' and 14' are converted to circularly polarized outputs 46 and 56 of the same helicity. Having the same helicities, signals 46 and 56 are differentially phase shifted in passing through rotator 50. The outputs 48, 54 of rotator 50 then travel to plates 40, 44, where they are converted back into their original linear polarization states, and output as signals 58, 62. The result is that signals 58, 62 are identical to inputs 12' and 14', but differentially phase shifted by a constant amount. In this manner, the arrangement of FIG. 3(a) imposes the sort of constant differential phase bias to counterpropagating signals required by member 18 of FIG. 1. By adjusting magnetic bias 52 on Faraday rotator 50, one can adjustably control the amount of the shift, and thus set the bias to any advantageous setpoint on the transmissivity response of the interferometer of FIG. 1.

FIG. 3(b) shows an alternative scheme for imparting such a controllable phase shift. Faraday rotators 64, 74 having respective and opposite magnetic biases 66, 76 are disposed along the same optical path with quarter wave plate 72. The polarities of counterpropagating input signals 12' and 14' are rotated by the same amount, but, because of the oppositely directed biases 66, 76, are rotated in opposite directions. Quarter wave plate 70 is disposed so that the polarization of output 46' of rotator 66 lies along the fast axis 72 of quarter wave plate 70, and output 56' of rotator 74 lies along the slow axis of plate 72. Thus the speeds with which signals 46' and 54' traverse plate 70 are different, imparting a differential phase between the signals. Upon exiting plate 70, rotators 66 and 76 rotate the states of polarization of signals 48' and 54' back to their original orientation (outputs 58, 62).

Although the discussion of the embodiments of FIG. 3, above, mentions only quarter wave plates, this is merely exemplary for the embodiment of FIG. 3(b). Here, one could use wave plates of arbitrary phase shift between their fast and slow axes. The ultimate criterion for the embodiment of FIG. 3(b) is that the wave plate is disposed to receive output of one Faraday rotator on the plate's fast axis, and receive the output of the other rotator on the plate's slow axis. The retardation of the wave plate is chosen to set the phase bias point; the waveplate may have either a fixed retardation or may be variable. In the embodiment of FIG. 3(a), one must use quarter wave plates because of the need to produce circularly polarized inputs to the Faraday rotator.

Analytic Basis for the Sagnac Modulator

The basis for the system of FIG. 1 is further understood from its theoretical underpinnings. The net phase $\phi$ on the optical signal in the interferometer of FIG. 1 which copropagates with the RF signal is:

$$\phi(t) = (\pi/V_\pi) V(t)$$

where $V_\pi$ is the half wave voltage for the modulator and V(t) is the RF voltage in waveguide 25 (FIG. 2) as a function of time. For the counterpropagating optical signal, the net phase depends on the time-average of the voltage it encounters in waveguide 25, i.e.:

$$\phi_-(t) = (\pi/V_\pi)(1/2\tau) \int V(t) dt$$

integrated from t−τ to t+τ, where τ=(nL/c) is the time of electro-optic interaction, n is the baseline optical index of refraction in waveguide 25, L the interaction length of modulator 16, and c the speed of light in a vacuum. Here, the limits of integration have been chosen to correspond to the situation where the modulator is centered within the Sagnac interferometer. The case where the modulator is offset from the interferometer midpoint may be accommodated by subtracting the delay in arrival time at the modulator (between the counterpropagating light and the copropagating light) from the limits of integration. If the spatial length of the modulation (RF) signal is significantly shorter than L, then a significant differential phase, and thus intensity modulation, can be generated. For $V(t) = V_o \cos(\Omega t)$, i.e. a simple sinusoid of angular frequency $\Omega$ (or a Fourier component of a more complicated RF signal from 26), the differential phase, $\Delta\phi_+ - \Delta\phi_-$, is:

$$\Delta\phi = \pi(V_o/V_\pi) \cos(\Omega t)[1-\sin(\Omega t)/\Omega t] \equiv \Delta\phi_o(t) F(v)$$

where $V = \Omega\tau/\pi$ is scaled frequency, and:

$$\Delta\phi_o(t) = \pi(V_o/V_\pi) \cos(\omega t) \equiv \Delta\phi_o \cos(\Omega t)$$

$$F(v) = 1 - \sin(\Omega t)/\Omega t = 1 - \sin(\pi v)/\pi v$$

The scaled frequency $v$ is a parameter such that $v=1$ corresponds to the counterporpagating light interacting with one full wavelength of the RF, $v=2$ corresponds to interaction with two wavelengths, etc. This is a convenient parameterization in that modulators of different lengths have equivalent operation when the frequency is expressed in terms of $v$.

As stated above, the transmission T of a Sagnac interferometer is:

$$T = \sin^2[\Delta\phi(t)/2 + \Phi]$$

where $\Phi$ is a constant phase offset bias. I $\Phi = \pi/2 = 90°$, i.e. biased at quadrature (which is also in the linear phase-transmissivity portion of a Sagnac interferometer), then:

$$T = \{1 + \sin[\Delta\phi_o(t) F(v)]\}/2$$

The significance of this result is illustrated by comparison with the transmission function for a standard Mach-Zehnder type intensity modulator. At quadrature bias, the transmission of the Mach-Zehnder modulator is identical to the above with $F(v)=1$, so that the operation of the Sagnac interferometer differs from the Mach-Zehnder response only by the factor $F(v)$, defined above. This factor has the property that it goes to zero at $v=0$, so the system of FIG. 1 has no DC or low frequency response. F(v) shows small oscillations about 1 of decreasing amplitude for $v>1$, indicating that the responsivity is equivalent to the Mach-Zehnder modulator at such frequencies. The low frequency response (for $v<1$) may be enhanced by offsetting the modulator from the interferometer midpoint, which may also be arranged to reduce the amplitude of the oscillations in the response for $v>1$. This suggests that the performance of the Sagnac based modulator is comparable to the Mach-Zehnder modulator, but with the added advantage of the inherent stability of the Sagnac configuration.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

We claim:

1. An electro-optic apparatus comprising:

a Sagnac interferometer;

means for receiving an optical input to said interferometer effective to create counter-propagating optical signals in the arms of said interferometer; and an electro-optic modulator disposed in said interferometer to receive said counter-propagating optical signals;

wherein said modulator comprises means for receiving an electrical signal effective to launch an electrical traveling wave through said modulator along the direction of propagation of said counter-propagating optical signals in said modulator;

wherein said modulator is adapted to cause the speed of propagation of said electrical signal, and said counter-propagating optical signals, be comparable in said modulator.

2. The apparatus of claim 1, wherein said electro-optic modulator comprises:

a substrate of electro-optic material;

an optical waveguide formed in said electro-optic material; and an electrical waveguide disposed along at least a portion of length of said optical waveguide;

wherein said optical waveguide and said electrical waveguide are disposed effective to cause electrical signals in said electrical waveguide to induce the electro-optic effect in said optical waveguide.

3. The apparatus of claim 2, wherein said electro-optic material is lithium niobate.

4. The apparatus of claim 2, wherein said electrical waveguide is an RF band waveguide.

5. The apparatus of claim 4, wherein said electro-optic material is lithium niobate.

6. The apparatus of claim 1, wherein said interferometer comprises a differential phase means for producing a preselected phase shift between said counter-propagating optical signals.

7. The apparatus of claim 6, wherein said differential phase means comprises:

two wave plates disposed along an optical path and having their principal optical axes displaced from one another about said path by a preselected angle; and a Faraday rotator disposed in said path between said two wave plates.

8. The apparatus of claim 6, wherein said differential phase means comprises:

two Faraday rotators disposed along an optical path; and a wave plate disposed between said rotators in said path.

9. An electro-optic method comprising:

directing an optical input to a Sagnac interferometer effective to create counter-propagating optical signals in the arms of said interferometer; and directing said counter-propagating optical signals through an electro-optic modulator disposed in said interferometer;

launching an electrical traveling wave through said modulator along the direction of propagation of said counter-propagating optical signals in said modulator;

selecting said modulator to have the speed of propagation of said electrical signal, and said counter-propagating optical signals, be comparable in said modulator.

10. The method of claim 9, further comprising:

disposing an optical waveguide and a electrical waveguide are in said modulator effective to cause electrical signals in said electrical waveguide to induce the electro-optic effect in said optical waveguide.

11. The method of claim 10, wherein said electro-optic material is lithium niobate.

12. The method of claim 10, wherein said electrical waveguide is an RF band waveguide.

13. The method of claim 12, wherein said electro-optic material is lithium niobate.

14. The method of claim 9, further comprising a step for inducing a selected differential phase shift between said counter-propagating optical signals.

15. The method of claim 14, wherein said step for inducing said differential phase shift comprises:

disposing two wave plates along an optical path and with their principal optical axes displaced from one another about said path by a preselected angle; and disposing a Faraday rotator in said path between said two wave plates.

16. The method of claim 14, wherein said step for inducing said differential phase shift comprises:

disposing two Faraday rotators along an optical path; and disposing a wave plate between said rotators in said path.

* * * * *